Sept. 19, 1967 R. F. GAMUNDI ET AL 3,342,335
WATER CONDITIONER
Filed Dec. 8, 1964 3 Sheets-Sheet 3

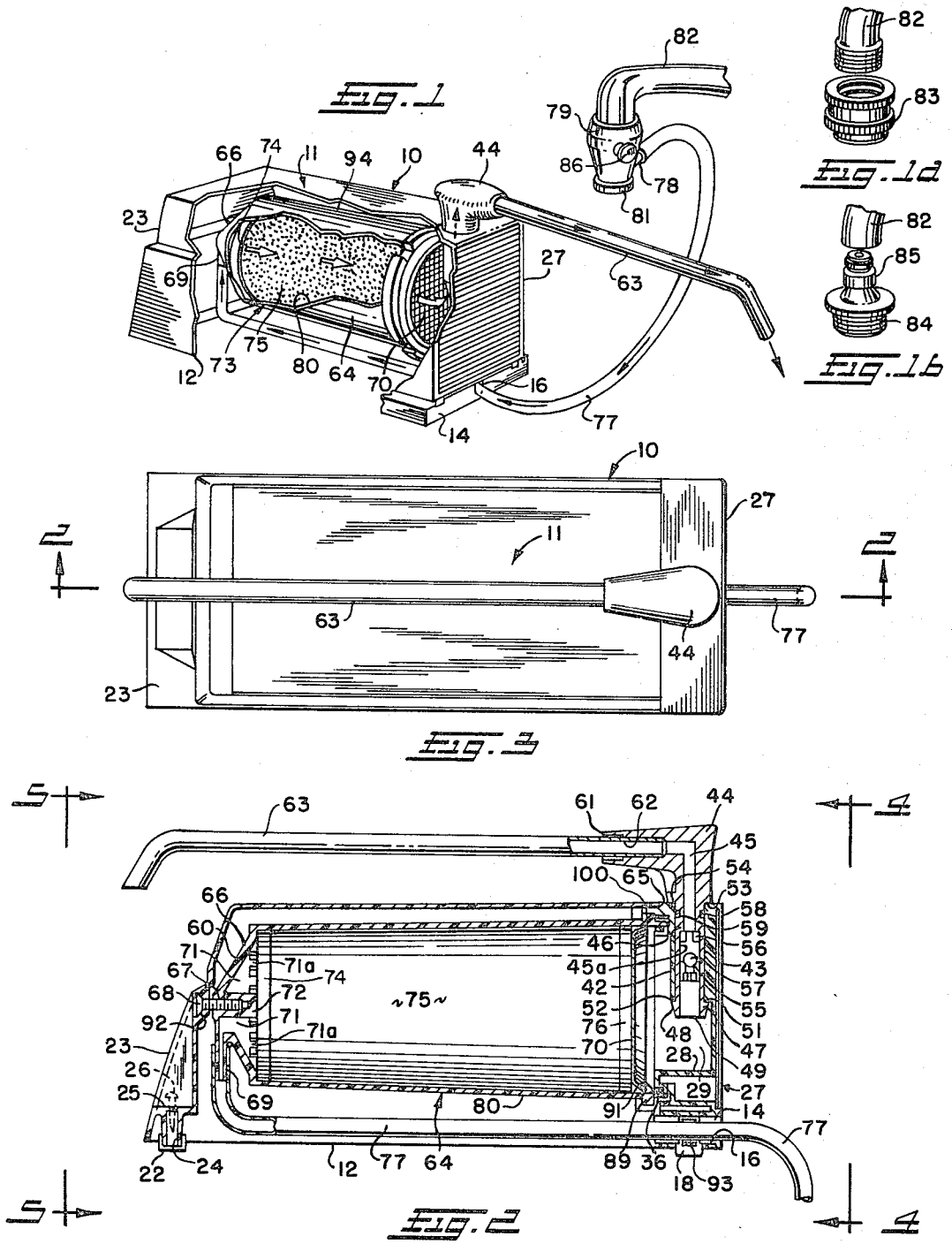

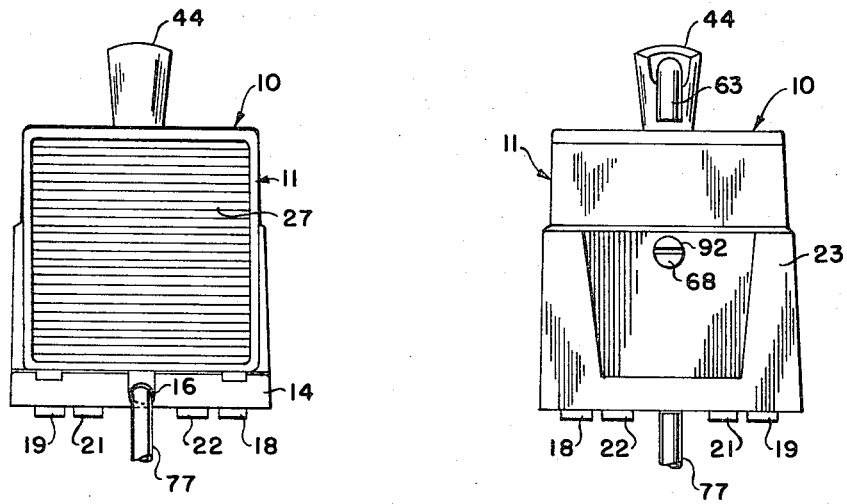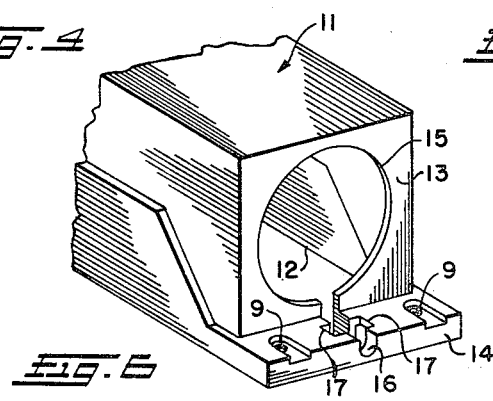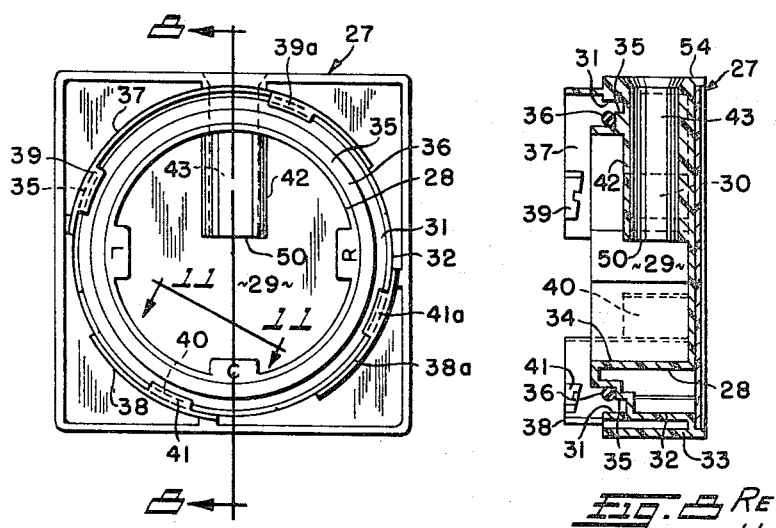

INVENTOR.
REYNOLD F. GAMUNDI
HARRY SHINDELL

ATTORNEYS

United States Patent Office 3,342,335
Patented Sept. 19, 1967

3,342,335
WATER CONDITIONER
Reynold F. Gamundi, South Euclid, and Harry Shindell, Toledo, Ohio, assignors to Eaton Manufacturing Company, a corporation of Ohio
Filed Dec. 8, 1964, Ser. No. 416,763
11 Claims. (Cl. 210—117)

ABSTRACT OF THE DISCLOSURE

A small lightweight apparatus for conditioning liquid from a source of liquid under pressure such as a water faucet in the kitchen sink. The apparatus includes a removable liquid conditioning cartridge which is horizontally disposed in a housing, and a closure cap for sealing the cartridge. A flexible hose communicating with the interior of the cartridge is provided for attachment to the water faucet to bring water under pressure into one end of the cartridge. A swivel spout is mounted on the closure cap in communication with the other end of the cartridge to permit conditioned water to pass from the cartridge, and means are provided in the cartridge for dispersing liquid uniformly through the liquid conditioning cartridge.

---

In the municipal treatment of water, it is quite common to add chemicals which makes the water rather unpalatable to some people. Moreover, water obtained from wells, many times contains large amounts of sulphur or iron which adds a rather unpleasant taste. It is desirable to remove such objectionable tastes, odors, colorants, and suspended matter causing cloudiness. It is further desired to remove or render innocuous such water contaminents effectively and economically.

This invention solves this problem by providing a small lightweight water filtering unit, which is economically manufactured, and which will remove or render innocuous such objectionable material as chlorine, sulphur, rust, scale, metallics and algae. The unit is compact and can be placed on the sink counter or mounted on a wall within easy reach of the user. The unit attaches quickly and easily to an inside faucet or tap, and may at times even be used outdoors by simply attaching it to an outside water faucet or silcock. A touch of the diverter valve allows water to flow through the filter whenever desired. The faucet or tap can still be used normally when the filter is not being used.

Activated charcoal filter units, which are desirably used in the unit, are disposable. The cartridge in which the filter is housed is easily detached from the other parts of the unit, making replacement of the filter a comparatively easy operation.

To the accomplishment of the foregoing and related ends, said invention, then, consists of means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is a partially cut away isometric view of one embodiment of a water filter shown connected to a water faucet or tap.

FIG. 1A is a fragmentary perspective view of one type of adapter for securing a flow diverter useful in accordance herewith to a faucet.

FIG. 1B is a fragmentary perspective view of another type of adapter for securing a flow diverter to a faucet.

FIG. 2 is a cross-sectional view of the water filter taken in the plane indicated by the line 2—2 of FIG. 3.

FIG. 3 is a top plan view of the water filter shown in FIG. 1 with the spout rotated to a storage position 180° from the position of the spout in FIG. 1.

FIG. 4 is a front end view of the water filter as seen from the plane indicated by the line 4—4 of FIG. 2.

FIG. 5 is a rear end view of the water filter as seen from the plane indicated by the line 5—5 of FIG. 2.

FIG. 6 is an isometric view of a portion of the filter housing, showing in particular the opening and the front cover supporting ledge in the front of the housing.

FIG. 7 is an enlarged view of the back of the front cover for the opening in the front of the housing.

FIG. 8 is a cross-sectional view of the front cover taken in the plane 8—8 of FIG. 7.

Figure 9:
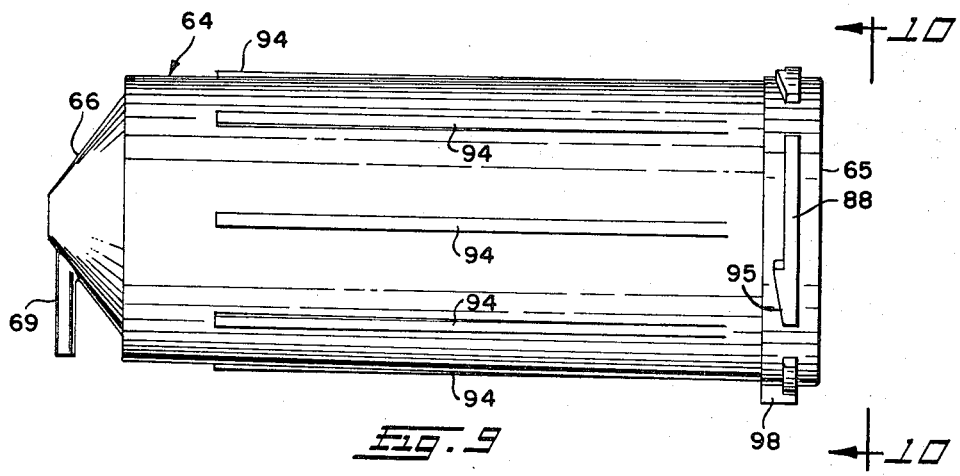
FIG. 9 is the side elevation of the cartridge for containing the filter medium.

Briefly stated, the present invention is in the provision of a fluid conditioning apparatus which is adapted to be connected to a suitable source of water to be conditioned. This apparatus comprises in combination a cartridge for holding the fluid conditioning medium, the cartridge being closed at one end and open at the other. Fluid inlet means are provided extended through the closed end of the cartridge, and a removable closure cap secured to the open end of the cartridge in sealing engagement therewith. Fluid outlet means extending through the cap and communicating with a rotatable fluid delivery spout. This structure is disposed in a housing for the cartridge and includes means for mating engagement with the removable closure cap. Suitable retaining means are provided coacting between the housing and the closed end of the cartridge.

Referring more particularly to FIGS. 1-8 of the annexed drawings, there is shown a water conditioning apparatus of this invention in adaptation as a water filter generally at 10. The parts of the apparatus with the exceptions herein noted, are preferably made of plastic. The water filter 10 has a base or housing 11 for holding the filtering components. Housing 11 is an elongated hollow encased shell except for the bottom 12 which is open. Housing front 13 is provided with a ledge 14 adjacent the bottom 12. The front 13 adjacent the ledge 14, has an opening 15 (FIG. 6), through which the filtering components are placed into the housing 11. A tube receiving recess 16, traverses the ledge 14 and extends through the opening 15 and carries a flexible conduit 77 which communicates with a source of water to be conditioned or filtered as the case may be. A section of the ledge 14 adjacent the recess 16, is cut away to form a recess 17 adapted to receive a strain relief clamp for the tube or conduit 77 as hereinafter described. The housing 11 is supported on legs 18 and 19 depending from the bottom of the ledge 14, and legs 21 and 22 adjacent the back 23 of the housing 11.

The legs are hollow each having a passageway 9 (FIG. 6) extending therethrough. The passageways 9 are conveniently covered over with a thin layer of material, e.g. passageway 24 in leg 22 is covered over with plastic material 25 (FIG. 2). This is done to give the housing 11 a more aesthetic appearance as the passageways in the legs are only used when the filter 10 is side mounted, i.e. the housing 11 is mounted to the side wall of a kitchen cabinet. The housing 11 is thus mounted by inserting any suitable fastening means, e.g. screw 26, through the hollow legs and fastening to the side wall.

A hollow square closure cap or cartridge cover 27, is designed to cover the opening 15. When in position covering the opening 15, the cartridge cover 27 rests against the housing ledge 14. Cartridge cover 27 has disposed on the inner face and integral therewith, an annular rim 28, which defines a fluid chamber 29 (FIGS. 7 and 8). A recess or groove 31, formed in the outstanding free annular marginal extremity of the rim 28, is designed to receive the open end of a cartridge or casing 64 containing the water conditioning medium.

The outer wall 32 of the rim 28, is substantially equal in depth to the depth of the sides, e.g. side 33, of the cover 27. The inner wall 34 of the annular rim 28, is of greater depth, and is designed to extend into the cartridge 64 in telescoping concentric relation therewith. A pliable sealer ring 36 is seated on an annular shoulder 35 formed in the recess 31.

A plurality of spaced arcuate portions, e.g. portions 37 and 38 and 38a concentric with the annular rim 28, are secured thereto adjacent the outer wall 32, and extend axially inwardly therefrom to telescopically overlie mating bayonet locking members on the cartridge 64. A plurality of spaced radially inwardly directed locking flanges, e.g. flanges 39 and 41, are spaced around the free marginal edge of the curved portions 37, 38 and 38a, for locking engagement with the mating bayonet locking members on the cartridge 64 to hold it to the cover 27.

A plurality of air vents, e.g. vents 30 and 40, spaced around the rim 28 and communicating with the recess 31, permits air to circulate around the sealer ring 36, to keep it soft and pliable.

An outlet tube or cylindrical sleeve 42 extends from the outside of the cover 27 into the fluid chamber 29. The sleeve 42 has a fluid outlet, opening or passageway 43 extending through it.

A spout adapter 44 is mounted for rotation in the passageway 43. Adapter 44 is preferably L-shaped and has a passageway 45 (FIG. 2) extending therethrough. The adapter 44 has a cylindrical portion 46 which is insertable and rotatable in the passageway 43. A pair of oppositely disposed resilient tongues 47 and 48 are formed in the end 49 of the portion 46. Tongues 47 and 48, respectively, adjacent their free extremities, are expanded to form stops 51 and 52. The overall width of the stops is greater than the inside diameter of the passageway 43. An annular shoulder 53 if formed in the adapter 44 adjacent the cylindrical portion 46.

When the adapter 44 is inserted into the passageway 43, the tongues 47 and 48 are compressed inwardly by the inner walls of the passageway 43. The adapter 44 is inserted until the annular shoulder 53 abuts the top 54 of the cover 27. The resilient tongues 47 and 48, respectively, then spring outwardly, and the stops 51 and 52 thereon, interlockingly coact with the end 50 (FIG. 8) of the cylindrical portion 42.

The passageway 45, in the tube end 49, is enlarged and has a valve seat 55 formed therein adjacent the resilient tongues 47 and 48. A valve stop 56 is also formed therein in spaced relation to the valve seat 55. A ball check valve 57 in the enlarged passageway 45a moves freely between the seat 55 and the stop 56, and retards retrograde flow of water into the main faucet outlet 82 when diverter valve 86 is changed to by-pass the water conditioner. The ball valve 57 permits water to flow from the reservoir 29 through the adapter 44, but blocks any flow of water or air back through the filter or conditioning medium due to aspiration effect into a water stream exiting through aerator 81 and carrying contaminants from the filter medium 75 as by back washing, into the water stream.

A pliable sealer ring 58, in an annular recess 59 in the adapter tube 42 adjacent the annular stop 53, sealingly coacts with the walls of the passageway 43 to keep water from escaping between the swivel adapter 44 and the cap 27. The passageway 43 at the other end 61 of the adapter 44, is enlarged to form a spout receiving opening 62.

A spout or nozzle 63 is secured in the opening 62 and communicates with the passageway 43. The spout 63 is, preferably, made of a non-corrosive metal, and desirably swivels or rotates above the filter 10 in a plane which is perpendicular to the plane of the cartridge cover 27.

A hollow cylindrical cartridge or casing 64 for holding the filtering or conditioning medium is suitably secured to the cartridge cover 27, for example by the bayonet coupling mentioned above, and extends therefrom for insertion in the housing opening 15. The front end 65 of the cartridge 64 is open. The back end 66 of the cartridge 64 is closed, being preferably conical. The walls 60 of the cartridge end 66 converge in a direction away from the front end 65. A hole 67 is drilled and tapped in the apex of the back end 66, to receive a conventionally designed threaded screw 68. A fluid inlet port 69 is formed in the end 66 adjacent the tapped hole 67 and communicates with the interior of cartridge 64. A plurality of radially disposed spacer fins, e.g. fins 71 are provided within the cartridge end 66, and integral therewith; for example such fins may be disposed at 45° angles.

The filter 73 within the cartridge 64, is formed by placing a fibrous disc or pad 74 on the spacer fins. The spacer fins keep the pad 74 in spaced relation to the inlet port 69. This is done to permit water entering the cartridge 64 to completely cover the filtering area of the pad 74. The diameter of the pad 74 is somewhat smaller than the inside diameter of the cartridge 64 to permit easy insertion and positioning thereof. Enough activated charcoal 75 is then placed in the casing on the pad 74 to substantially fill the cartridge 64. A similar pad 76 is then placed over the charcoal 75. A porous material, e.g. metal screening 70, is wedged in the cartridge 64 against the pad 76 to hold the filter 73 therein, while permitting the filtered water to flow therethrough. Although the filter 73 is built-up as described, it should be understood that the filter 73 may be made as a unit for easy replacement in the cartridge 64.

A piece of resilient tubing 77 is secured to the inlet port 69 and extends forwardly from the rear of the cartridge toward the open end and exits from the device through recess 16. The free end of the tubing 77 is secured to an outlet port 78 (FIG. 1) of a conventionally designed diverter 79. In the particular embodiment shown, the diverter 79 is substantially cylindrical in shape having both ends open. The diverter ends are internally threaded; one end having secured thereto, a conventionally designed aerator 81, and the other end adapted for threaded engagement to a water faucet 82.

Typical adapters 83 and 84 (FIGS. 1A and 1B), may be used to secure the diverter 79 to different types of faucets. For example, adapter 83 is a reducer coupling used where the diameter of the external threads on the faucet is greater than the diameter of the internal threads on the diverter. Adapter 84 is used where there are no external threads on the faucet. The adapter 84 has an expandable portion 85, which when inserted into the faucet and expanded, frictionally holds the diverter to the faucet. Water channels (not shown) connect the outlet port 78 with the open ends of the diverter 79.

The diverter valve 86 is reciprocable sideways in the diverter 79 to regulate the flow of water through the diverter 79. When the valve 86 is in one position within the diverter 79, water flows from the faucet 82 into the tubing 77 and through the filter 10. When the valve 86 is in its other position within the diverter 79, water flows through the aerator 81.

In operation the diverter 79 is secured to the kitchen faucet 82. The tubing 77 is attached to the diverter 79 and the cartridge 64, filled with the filter 73. The cartridge cover 27 is then locked to the cartridge 64 by placing the open end 65 of the cartridge 64 into the annular recess 31 and twisting or rotating the cartridge 64. The locking latches on the curved portion of the cartridge cover 27, e.g. latches 39, 39a, 41 and 41a lockingly engage mating bayonet members, e.g. bayonet members 88 and 89 (two others not shown), circumferentially spaced around the outer periphery of the cartridge wall 80 adjacent the open end 65. The opposing locking latches are designed to permit engagement therebetween in a plurality of positions, whereby the cartridge cover 27 may be angularly disposed relative to the cartridge 64 in several positions.

An annular shoulder 91, formed inside the cartridge 64, adjacent the open end 65, engages the pliable sealer ring 36 to effect a seal between the cartridge 64 and the cap 27 to prevent leakage of water from the filter 10.

After locking the cartridge 64 to the cartridge cover 27, the cartridge 64 with tubing 77 attached thereto, is inserted into the housing opening 15, the tubing 77 lying in the recess 16 formed in the ledge 14. The screw 68 is placed through the screw hole 92 in the housing end 23, and into the tapped hole 67, where it is engaged to hold the entire structure in water tight assembled condition.

The cartridge 64 may be filled with any suitable water conditioning material, e.g. an ion exchange resin for removing hardness, activated charcoal for removing odor and color imparting components, porous resin bonded cellulose filter material for removing suspended matter, etc., to effect the desired alteration of the water or fluid composition.

A strain relief clamp 93 may be clamped to the tubing 77 in the recess 17. The clamp 93 limits the lateral movement of the tubing 77 in the recess 16 and keeps the tubing 77 from being pulled from the inlet port 69.

FIGS. 1 and 2 illustrate the ideal position of the tubing 77 and inlet port 69 relative to the housing 11. Knowing this, and recognizing the need to swing the spout 63 in a horizontal plane, the need for positioning the cartridge cover 27 relative to the cartridge 64 is readily understood.

A plurality of tapering longitudinal reinforcing ribs e.g. member 94 (FIG. 1), may be circumferentially spaced around the outside of the cartridge 64 to improve the rigidity of the cartridge body.

Figure 10:
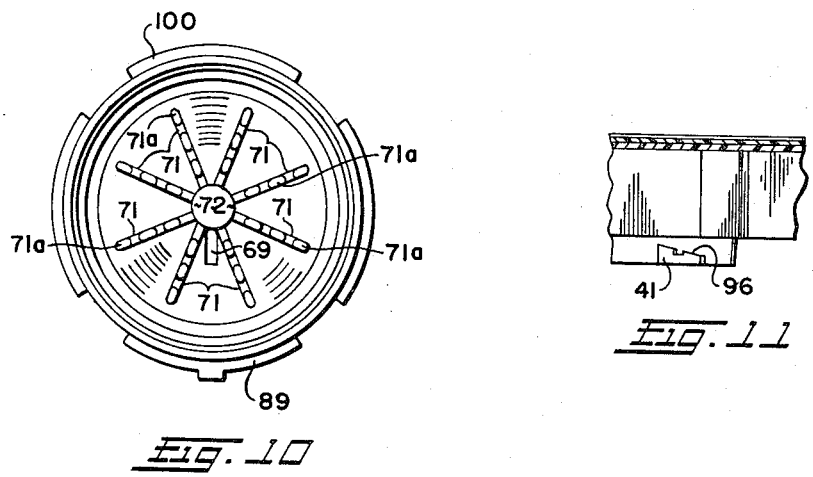
FIG. 10 is a front view of the cartridge shown in FIG. 9 showing the interior of the cartridge and spider spacing means adjacent the closed end of the cartridge for supporting a porous fluid distributing pad and distributing unconditioned fluid uniformly to the distributing pad.
Figure 11:
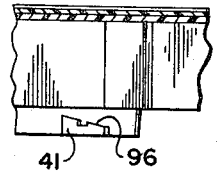
FIG. 11 is a fragmentary view taken in the plane indicated by the line 11—11 in FIG. 7.

Referring more particularly to FIGS. 9, 10 and 11, there is here illustrated in greater detail the structure of the cartridge 64, and a preferred mode of attachment of the cartridge to the closure member or cap 27. The structure of the cartridge has been substantially described above in connection with the description of FIGS. 1 and 2. FIGS. 9 and 10 illustrate the cartridge in greater detail and show the conical fluid distributing end 66, the tapered body portion 64, and the front or open end 65. As indicated above a plurality of longitudinal reinforcing ribs 94 may be cast integral with the cartridge body. FIG. 10 is a view showing the inside of the cartridge 64 illustrating the inlet 69, and a spider structure including a plurality of ribs or fins 71 integrally cast in the closed end of the cartridge 64, and radiating from a central pin 72 at 45° angles to form a spider. Fins 71 are provided with spaced projections 71a for the purpose of spacing a fluid distributing disc or pad 74 from the spider composed of fins 71. This spacing allows fluid to flow from the inlet into each of the adjacent sections defined by the fins and the closed end 66 thereby distributing the fluid evenly across the face of disc or pad 74. Disc 74 then serves as a more refined distributing means to guide the fluid into the filtering medium 75 (FIG. 2) and prevent channeling within the conditioning medium 75 which would reduce the efficiency of fluid treatment.

Also shown in FIG. 10 is a front view of the open end 65 of the cartridge or canister 64 and illustrating the bayonet members which are adapted to coact with the cap 27 when the parts are rotated relative to each other in a fashion typical to such bayonet couplings. FIG. 9 shows in greater detail a bayonet member 88 having a tapered surface 95 adapted for coaction with the correspondingly tapered confronting surface 96 (FIG. 11) on the latch member 41. Accordingly, when the bayonet members are inserted in the spaces between the latch members 39, 39a, 41 and 41a, and the annular shoulder 91 brought into contact with the sealing ring 36, rotation of the cartridge 64 relative to the cap 27 causes sliding coaction between the inclined surfaces 95 and 96 whereby the cartridge is urged into tight interlocked sealing engagement with the cap effecting a compression of ring 36 to form a fluid tight seal between the parts.

The spaces between the portions 37, 38 and 38a (FIG. 7) correspond in length to the angular displacement required to effect the fluid tight seal mentioned above diminished by the width of stop 98. Stop 98 is positioned adjacent the open end of the cartridge 64 for coaction with the edges of the arcuate portions 37, 38 and 38a, and serves as an indexing means to locate the position of inlet 69. The bosses shown in FIG. 7 and marked with indicia L, C and R respectively, signifying left, center and right, respectively, provide a means for locating the inlet 69 in a predetermined desired position. As shown in FIG. 10 the bayonet members 88, 89, 99 and 100 are uniformly circumferentially spaced around the periphery of the cartridge 64, the spaces corresponding in position and width to the location of the locking latches 39, 39a, 41 and 41a so that the protruding bayonet members 88, 89, 99 and 100 may be moved into position axially forwardly of the latches 39, 39a, 41 and 41a prior to rotation of the cartridge relative to the cap to effect an interlock.

The water conditioning apparatus of the present invention is conveniently formed of four cast parts formed from a plastic material such as phenol-formaldehyde resin, melamine-aldehyde resin, polystyrene, or the like. The cap member may be cast as a single piece, the cartridge may be cast as a single piece, the housing may be cast as a single piece, and the rotatable member for the outlet nozzle may be cast in sections for assembly thereof effecting a very inexpensive but highly useful and ornamental water conditioning device for home use. Replacement of the water conditioning medium or filter medium is a relatively simple matter.

Other modes of applying the principle of this invention may be employed instead of those specifically set forth above, changes being made as regards the details herein disclosed, provided the elements set forth in any of the following claims, or the equivalent of such be employed.

It is, therefore particularly pointed out and distinctly claimed as the invention:

1. An apparatus for conditioning fluid from a source of fluid under pressure, comprising in combination:
   (a) a housing for sitting freely on a generally horizontal surface, and having an opening at one end;
   (b) an elongated removable fluid impervious hollow cartridge, insertable in said opening and held within said housing in a generally horizontal position, said cartridge having one end sealed and the other end open;
   (c) a closure cap removably mounted in sealing relation on the open end of the cartridge and covering the opening in said housing when the cartridge and attached cap are mounted on said housing;
   (d) a hollow rigid spout mounted on the cap in communication with the open end of the cartridge for allowing fluid to pass from the cartridge, said spout being rotatable in a plane parallel to the longitudinal axis of the cartridge;
   (e) an inlet disposed in the closed end of the cartridge for allowing fluid under pressure to enter the cartridge;
   (f) a flexible hose secured directly to the inlet and extending from the housing for carrying fluid under pressure to the cartridge;
   (g) a fluid pervious disc disposed adjacent each end of the cartridge, the discs lying in planes normal to the longitudinal axis of the cartridge and defining a fluid conditioning chamber;

(h) means disposed in the chamber for conditioning fluid;

(i) means disposed in the cartridge adjacent the inlet for distributing fluid under pressure uniformly over the adjacent disc;

(j) means for detachably mounting the cartridge and attached cap on the housing.

2. The fluid conditioning apparatus of claim 1, wherein the fluid distributing means includes a plurality of fins radiating from the longitudinal axis of said cartridge and defining a plurality of chambers, and means for distributing fluid to each of said chambers.

3. The fluid conditioning apparatus of claim 2, wherein the means for distributing fluid to each of said chambers includes a plurality of spaced projections on each fin for defining passages between adjacent fluid chambers.

4. The fluid conditioning apparatus of claim 1, which includes a valve coacting with the spout for keeping air and fluid from moving through the cartridge towards the inlet.

5. The fluid conditioning apparatus of claim 4, which includes a unitized assembly for the spout and valve, and means for detachably mounting said unitized assembly on the closure cap.

6. The fluid conditioning apparatus of claim 1, which includes an adapter through which fluid can pass, disposed in the free end of the flexible hose for attachment to the source of fluid under pressure, and a valve movably disposed within the adapter for diverting fluid into the flexible hose.

7. The fluid conditioning apparatus of claim 1, which includes means for locking the closure cap on the open end of said cartridge, said means including a plurality of uniformly spaced locking members adjacent the open end of the cartridge and a plurality of latching means disposed on the cap for mating locking engagement with the locking member, and a plurality of spaced arcuate portions overlying the open end of said cartridge for supporting said latching means.

8. The fluid conditioning apparatus of claim 7, which includes an indexing stop projecting from at least one of the bayonet locking members for receipt between the spaced arcuate portions to hold the interlocked cap and cartridge in a plurality of arcuately spaced relative positions.

9. A fluid conditioning apparatus connectable to a source of fluid under pressure, comprising in combination:

(a) a fluid conditioning cartridge closed at one end and open at the other;

(b) a fluid inlet extending through the closed end of the cartridge;

(c) fluid distributing means disposed in the closed end of said cartridge and including a plurality of radial fins integral with the closed end and a porous distributing disc defining a plurality of fluid chambers, and a plurality of spaced projections extending from said fins for spacing the disc therefrom and defining fluid passageways between adjacent fluid chambers;

(d) a removable closure cap secured to the open end of the cartridge in sealing engagement therewith;

(e) a fluid outlet extending through the cap;

(f) a rotatable fluid delivery spout communicating with the outlet;

(g) a housing enclosing the cartridge including means for mating engagement with said removable closure cap; and (h) retaining means coacting between the housing and the closed end of said cartridge.

10. A fluid conditioning apparatus connectable to a source of fluid under pressure, comprising in combination:

(a) a fluid conditioning cartridge closed at one end and open at the other;

(b) a fluid inlet extending through the closed end of the cartridge;

(c) a removable closure cap secured to the open end of the cartridge in sealing engagement therewith;

(d) a plurality of bayonet locking members uniformly spaced adjacent the open end of the cartridge;

(e) a plurality of bayonet receiving and latching means disposed on the closure cap for interlocking mating engagement with the bayonet locking members on the cartridge, said bayonet receiving and latching means being supported on a plurality of spaced arcuate portions for telescopically overlying the open end of said cartridge;

(f) a fluid outlet extending through the cap;

(g) a rotatable fluid delivery spout communicating with the outlet;

(h) a housing enclosing the cartridge including means for mating engagement with said removable closure cap; and (i) retaining means coacting between the housing and the closed end of said cartridge.

11. A fluid conditioning apparatus in accordance with claim 10 in which the arcuate portions are spaced apart a predetermined distance, and an indexing stop projects from said cartridge adjacent the open end thereof for coaction with the spaces between said arcuate portions.

References Cited

UNITED STATES PATENTS

| | | | |
|---|---|---|---|
| 685,159 | 10/1901 | Madden | 210—448 X |
| 1,271,681 | 7/1918 | Duryea | 210—448 X |
| 1,927,582 | 9/1933 | Denk | 210—117 |
| 2,520,124 | 8/1950 | Chaney et al. | 210—291 X |
| 2,647,633 | 8/1953 | Greene | 210—282 |
| 3,184,064 | 5/1965 | Sampson et al. | 210—282 X |
| 3,197,029 | 7/1965 | Yelinek et al. | 210—91 |
| 3,204,770 | 9/1965 | Brink | 210—282 |

REUBEN FRIEDMAN, *Primary Examiner.*

D. M. RIESS, *Assistant Examiner.*